(12) United States Patent
Abedin et al.

(10) Patent No.: US 9,244,218 B2
(45) Date of Patent: Jan. 26, 2016

(54) FEW MODED FIBER DEVICE EMPLOYING MODE CONVERSION

(75) Inventors: Kazi S. Abedin, Basking Ridge, NJ (US); John M. Fini, San Jose, CA (US); Man F. Yan, Berkeley Heights, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 13/261,818

(22) PCT Filed: Aug. 10, 2012

(86) PCT No.: PCT/US2012/050477
§ 371 (c)(1),
(2), (4) Date: Mar. 19, 2015

(87) PCT Pub. No.: WO2013/023193
PCT Pub. Date: Feb. 14, 2013

(65) Prior Publication Data
US 2015/0192733 A1    Jul. 9, 2015

Related U.S. Application Data

(60) Provisional application No. 61/521,902, filed on Aug. 10, 2011.

(51) Int. Cl.
| | |
|---|---|
| G02B 6/02 | (2006.01) |
| G02B 6/14 | (2006.01) |
| H01S 3/067 | (2006.01) |
| G02B 6/028 | (2006.01) |
| G02B 6/26 | (2006.01) |
| G02F 1/01 | (2006.01) |
| H01S 3/094 | (2006.01) |
| H01S 3/30 | (2006.01) |

(52) U.S. Cl.
CPC ........ *G02B 6/02057* (2013.01); *G02B 6/02071* (2013.01); *G02B 6/0288* (2013.01); *G02B 6/02095* (2013.01); *G02B 6/02295* (2013.01); *G02B 6/14* (2013.01); *G02B 6/26* (2013.01); *G02B 6/268* (2013.01); *G02F 1/0115* (2013.01); *H01S 3/0675* (2013.01); *H01S 3/06758* (2013.01); *H01S 3/094007* (2013.01); *H01S 3/302* (2013.01); *H01S 2301/20* (2013.01)

(58) Field of Classification Search
CPC .................................... G02B 6/02; G02B 6/26
USPC ...................................................... 385/28, 37
See application file for complete search history.

(56) References Cited

U.S. PATENT DOCUMENTS 5,848,204 A * 12/1998 Wanser ............... G01L 1/246
                                                           385/12
5,864,644 A *  1/1999 DiGiovanni ......... G02B 6/2856
                                                           385/43

(Continued)

*Primary Examiner* — Kaveh C Kianni
(74) *Attorney, Agent, or Firm* — Sam S. Han, Esq.

(57) ABSTRACT

A few-moded fiber device has several discrete sections of few-moded fibers that are separated by mode converters, with each mode converter accomplishing mode conversion between one or more pairs of modes. The mode conversions can be accomplished using a sequence, such as a periodic or cyclic sequence that would cause (1) a signal wave launched with any mode to assume every other mode for one or more times; (2) the number of times the signal remains in any modal state is substantially the same; and (3) the net signal gain or loss or group delay of the input signal is substantially the same regardless of the state of input mode. A laser few-mode amplifier is provided. An optical transmission system is also provided.

19 Claims, 23 Drawing Sheets

(56) References Cited

U.S. PATENT DOCUMENTS

| | | | |
|---|---|---|---|
| 6,397,636 B1* | 6/2002 | DiGiovanni | G02B 6/2856 65/395 |
| 6,823,117 B2* | 11/2004 | Vakili | G02B 6/14 385/43 |
| 2003/0202547 A1* | 10/2003 | Fermann | H01S 3/067 372/6 |
| 2004/0194512 A1* | 10/2004 | Hong | C03B 37/027 65/402 |
| 2004/0196537 A1* | 10/2004 | Starodoumov | H01S 3/094003 359/341.3 |
| 2006/0029346 A1* | 2/2006 | Ramachandran | G02B 6/02071 385/124 |
| 2010/0086251 A1* | 4/2010 | Xu | G02F 1/3513 385/1 |
| 2015/0192733 A1* | 7/2015 | Abedin | G02B 6/02071 385/28 |

* cited by examiner

A⋯B⋯C⋯D⋯A⋯B⋯C⋯D⋯A⋯B⋯C⋯D⋯A
B⋯A⋯A⋯A⋯D⋯D⋯D⋯C⋯C⋯C⋯B⋯B⋯B
C⋯C⋯B⋯B⋯B⋯A⋯A⋯A⋯D⋯D⋯D⋯C⋯C
D⋯D⋯D⋯C⋯C⋯C⋯B⋯B⋯B⋯A⋯A⋯A⋯D

FEW MODED FIBER DEVICE EMPLOYING MODE CONVERSION

STATEMENT OF RELATED CASES

This application claims the benefit of U.S. Provisional Patent Application Ser. No. 61/521,902, having the title "Few-moded fiber device employing mode conversion," filed on Aug. 10, 2011, the entirety of which is incorporated herein by reference.

BACKGROUND

There has been significant interest in using higher-order modes of optical fibers for multiplexing data to enhance the bandwidth of transmission. Since various modes display various shapes in the plane of fiber cross section, this is commonly known as spatial division multiplexing (SDM), or mode division multiplexing. To compensate the loss in the fiber link, fiber amplifiers capable of amplifying all the modes of interest are required. SDM transmission links that are based on higher order modes depend on multiple-input, multiple-output (MIMO) signal processing, which demands for small modal dispersion of the link.

Rare-earth doped or nonlinear (Raman) fibers can be made with core sizes large enough to support various modes such as $LP_{01}$, $LP_{11}$, $LP_{02}$, $LP_{21}$, etc. Since the radial field distribution of these modes are different, the overlap factor $\Gamma$, of the electrical field of individual modes with the gain region can differ significantly. The overlap factor is defined as:

$$\Gamma = \int_{R1}^{R2}\int_0^{2\pi} E^2 r\, dr\, d\phi \Big/ \int_0^\infty \int_0^{2\pi} E^2 r\, dr\, d\phi$$

where, R1 and R2 are the radii of the circular region within which various signal modes experience amplification. In a typical amplifier with a cylindrical doped region, R1 is typically zero.

As $\Gamma$ depends on the transverse mode of the signal wave, the gain experienced in a few mode amplifier (both the rare-earth and Raman/Brillouin amplifiers) by the different modes becomes different. This difference in gain can be problematic when used to amplify various modes carried by a few-moded fiber in a space division multiplexed (SDM) transmission system. It has not yet been possible to split and/or combine various fiber modes without causing significant losses in order for them to be amplified by separate C-, L-band amplifiers (schemes similar to that used in C+L band signal amplification). Another problem associated with SDM transmission systems involving few-moded fiber links is that the group index $n_g$ and thus group delay of each mode can be significantly different.

Therefore, there is a need for a few-mode fiber amplifier or amplifying device that will ensure equal gain to all the modes of the fiber.

SUMMARY

Embodiments of the present invention depict a few-moded optical fiber device to process an input optical signal containing N modes, where N is an integer greater than or equal to 2, including an input few-moded fiber enabled to receive the input signal, at least N mode converters arranged in a predetermined order, wherein a first mode converter of the N mode converters is coupled to the input few-moded fiber, wherein each mode converter transforms one modal state of the N modal states to a different mode, a few-moded connecting fiber between each of the N mode converters, and an output few-moded fiber coupled to a last mode converter of the N mode converters to provide an output optical signal containing the N modal states, wherein each of the N modes in the optical output signal are characterized by a substantially identical transmission parameter relative to corresponding N modes of the input signal, such as gain, loss, group delay and/or dispersion.

DESCRIPTION OF THE INVENTION

Figure 1:
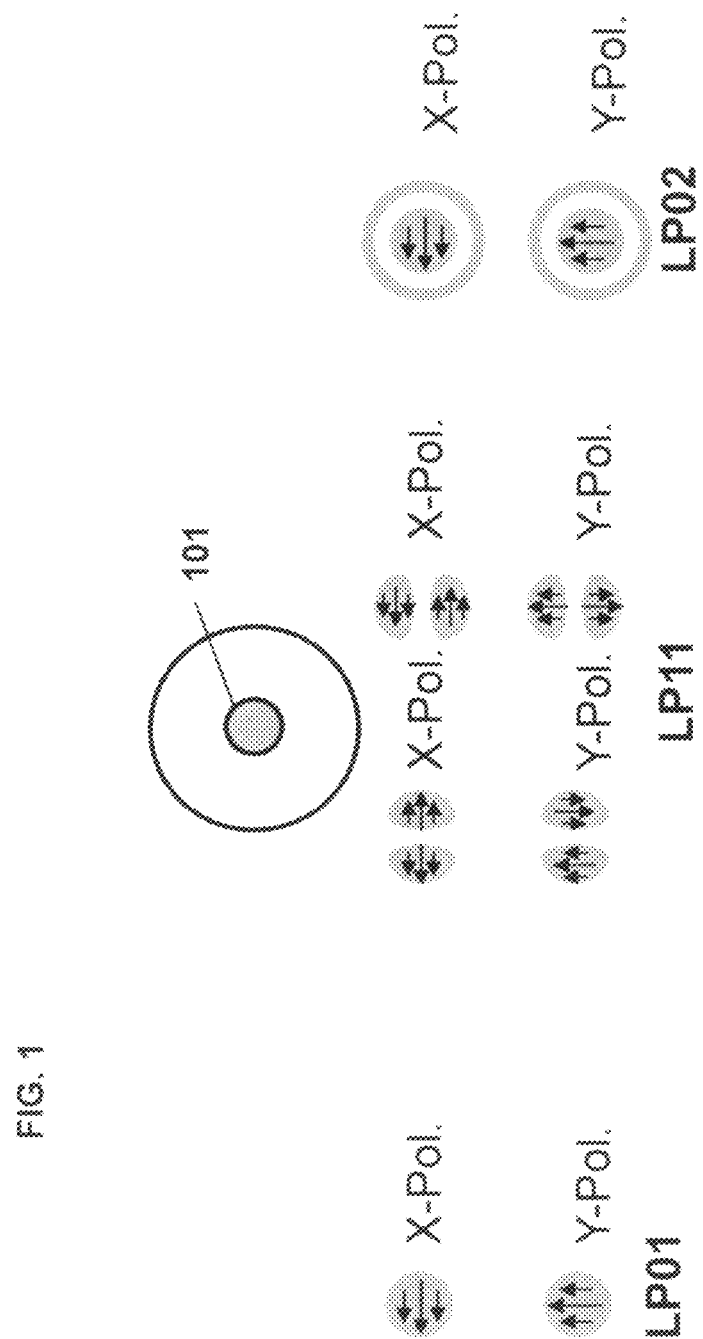
FIGS. 1 and 2 illustrate intensity distribution for low order modes in a step index fiber.

To address these and other problems, a novel architecture is provided of a few-moded fiber device or link involving a multiple mode transformation process along its length. This ensures equal optical properties (e.g., gain, absorption, group delay, or dispersion) for all the relevant input modes.

The few-moded fiber device provided herein incorporates discrete mode converters and a few-moded fiber section (passive and active) placed alternately such that modes are converted from one to another as an optical signal travels from one fiber-section to the next. This is done in such a way that the signal wave launched in any mode is amplified (or absorbed in the absence of pump) by the same amount or experiences the same amount of group delay or dispersion. In this application, a mode converter serves the purpose of changing one waveguide or fiber mode (e.g., $LP_{mn}$ to $LP_{xy}$, and vice versa).

More specifically, the fiber device has several discrete sections of few-moded fibers that are separated by mode converters, with each mode converter accomplishing mode conversion between one or more pair(s) of modes. The mode conversions can be accomplished using a sequence, such as a periodic or cyclic sequence that would cause the following: (1) a signal wave launched in any mode to assume every other mode one or more times; (2) the number of times the signal remains in any modal state is the same; and (3) the net signal gain or loss or group delay or dispersion of the input signal is the same regardless of the state of input mode. The number of modes involved in the modal conversions can be equal to or less than the modes supported by the few-mode fibers, and must include at least all the modal states of the input signal that are of interest. Practically speaking, there may be significant fabrication imperfections, unintentional perturbations, etc., such that delay, gain and loss cannot be completely independent of input mode. The disclosed schemes provide statistically greater mixing of modes and thus statistically greater independence of input launch than would be achieved otherwise. Details of the design features of this few-moded fiber device are provided herein.

In accordance with various aspects of the present invention the following devices, fibers, and features of fibers are provided:

a) A few-moded fiber device that incorporates at least two or more distinct mode converters, arranged in a preferred sequence, and separated by certain length of few-moded fiber or fibers (passive or active gain fiber), each fiber being capable of supporting multiple higher-order modes.

b) In the aforesaid few-moded fiber device, the mode-conversion sequence is such that i) at each of the mode-converters (at a given location), one or more modes are interchanged between one (or more) pair of modes, ii) after each mode-conversion process, all modes remain different from one another, iii) at the end of the sequence, the modes are restored to the original state (i.e., substantially the same as at the input), and iv) the overall gain or loss, or group delay or dispersion associated with each launched mode is substantially the same.

c) The length of the gain fibers separating the mode-converters is such that the gain (or loss) experienced by any particular mode (e.g., $LP_{01}$) in each gain section will be substantially the same.

d) The length of the passive fibers separating the mode-converters should be such that the group delay experienced by any particular mode (e.g., $LP_{01}$) in each gain section will be substantially the same.

e) Item (c) further implies that in the absence of gain saturation, (e.g., when the gain per unit length is substantially the same), the length of gain sections will be nominally equal. In the presence of significant gain saturation occurring along the gain fiber, the span of successive amplifying sections can be made different (e.g., increasingly longer) such that any given mode is amplified by substantially the same amount in each of the gain sections.

f) Item (d) further implies that when the few mode fibers located in between the converters have substantially the same group delay per unit length, the length of the sections will be nominally equal.

g) The mode-conversion between different modes (e.g., $LP_{01}$, $LP_{11}$, and $LP_{02}$) is performed using long period gratings (LPG) or by applying periodic micro bends or bulk spatial phase modulators, or volume phase grating or photonic lattice (e.g., 1D). For conversion between radially symmetric modes (e.g., $LP_{01} \leftrightarrow LP_{02}$), an LPG is preferred. For conversion, involving radially asymmetric modes (e.g., $LP_{01} \leftrightarrow LP_{11}$ or $LP_{02} \leftrightarrow LP_{11}$), periodic index variation employing periodic microbends are preferred over other conversion means.

h) In one embodiment of the present invention, each gain section is pumped using a common pump wave launched in the forward or in the backward direction or in both direction. Alternately, each gain section is pumped by individual pump waves to suppress pump depletion.

j) The gain section in one embodiment of the present invention is one that is doped with one or more rare earth elements (for rare earth amplifiers), or doped with other elements such as germanium to enhance nonlinearity (for Raman or Brillouin amplifiers).

k) In one embodiment of the present invention, the fiber sections connecting the mode converters are passive fibers instead of gain fibers. This will ensure that the net modal dispersion becomes zero.

l) In one embodiment of the present invention, the gain fibers are separated by isolators to suppress back-reflections and suppress amplified spontaneous emission (ASE) noise.

m) In one embodiment of the present invention, the few-mode amplifier is terminated by Bragg gratings or reflectors to operate as lasers that will simultaneously oscillate with different spatial modes.

Figure 2:
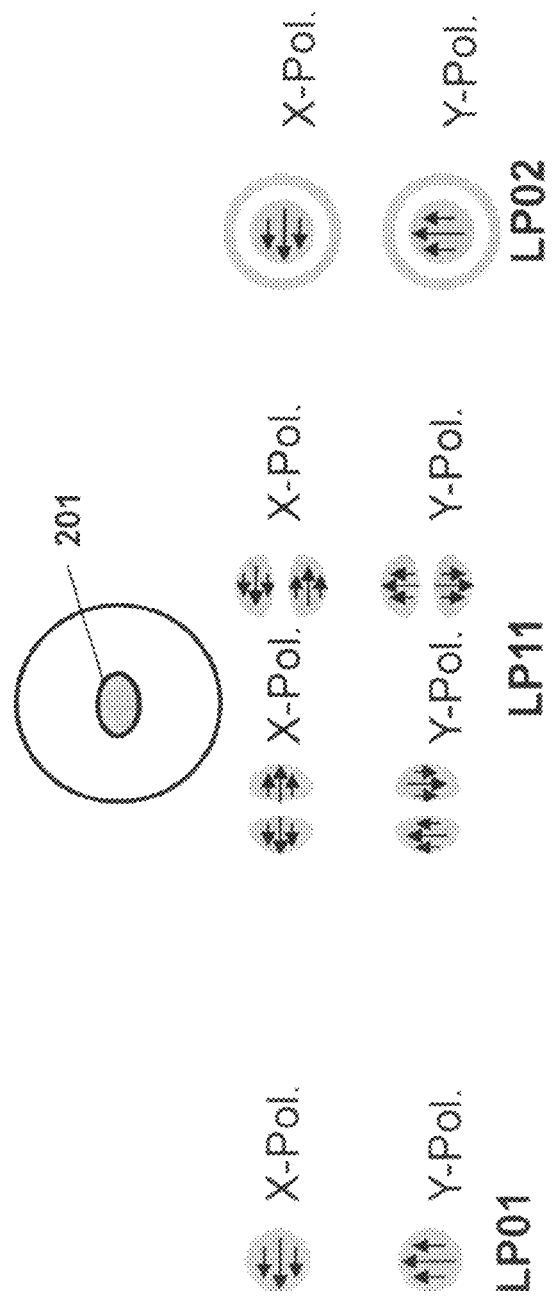

Few-moded or few-mode (also known as higher-order mode fiber or HOM) fibers are known to support fiber modes with distinct radial/transverse power distribution as illustrated in FIGS. 1 and 2 which provide each in diagram a schematic of intensity distribution for some low order modes in a step index fiber, with a circular core 101 in FIG. 1 and an elliptical core 201 in FIG. 2.

While $LP_{01}$ and $LP_{02}$ are radially symmetric and peaked at the center, $LP_{11}$ has multiple lobes. Like the fundamental mode $LP_{01}$, higher-order modes can exist with two orthogonal polarizations.

Further, radially asymmetric modes such as $LP_{11}$, can have different orientation of the lobe pattern. In a fiber with circular cores, two different orientations of such lobes can exist. By using an elliptical core as shown in FIG. 2, however, it is possible to make $LP_{11}$ modes non-degenerate, so that accidental coupling between these modes is drastically reduced.

Figure 3:
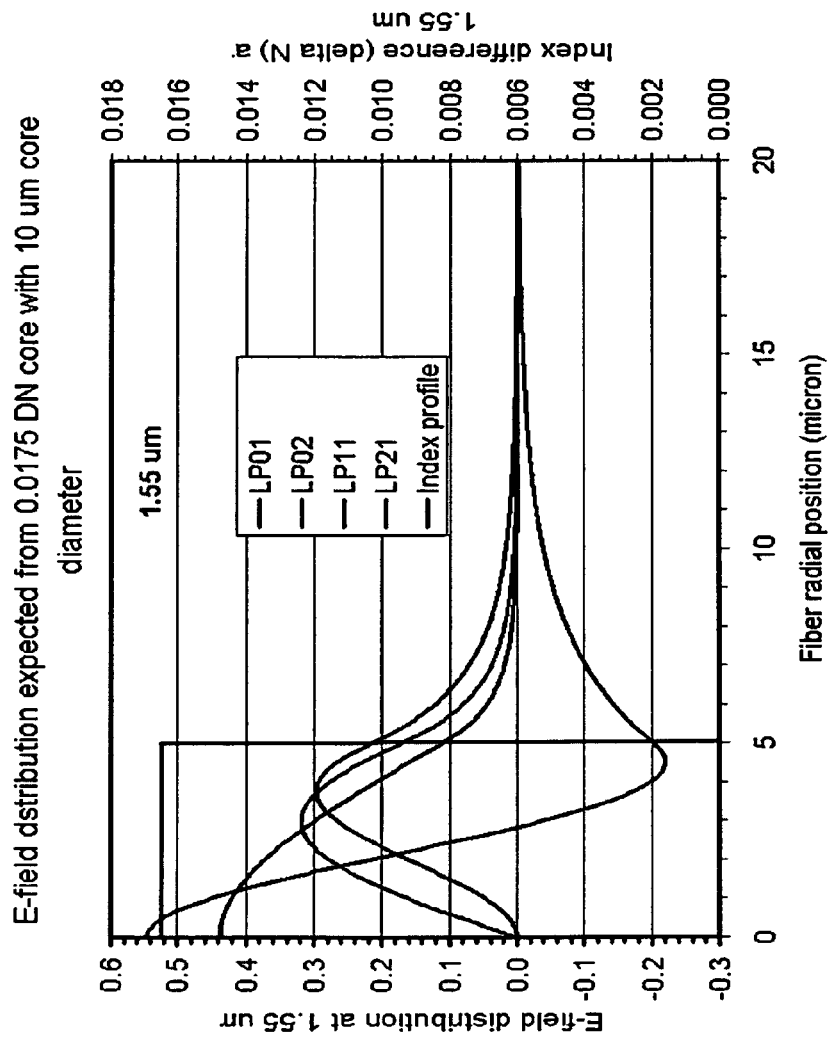
FIGS. 3-5 illustrate radial electric-field distribution of certain modes of a step index fiber.
Figure 4:
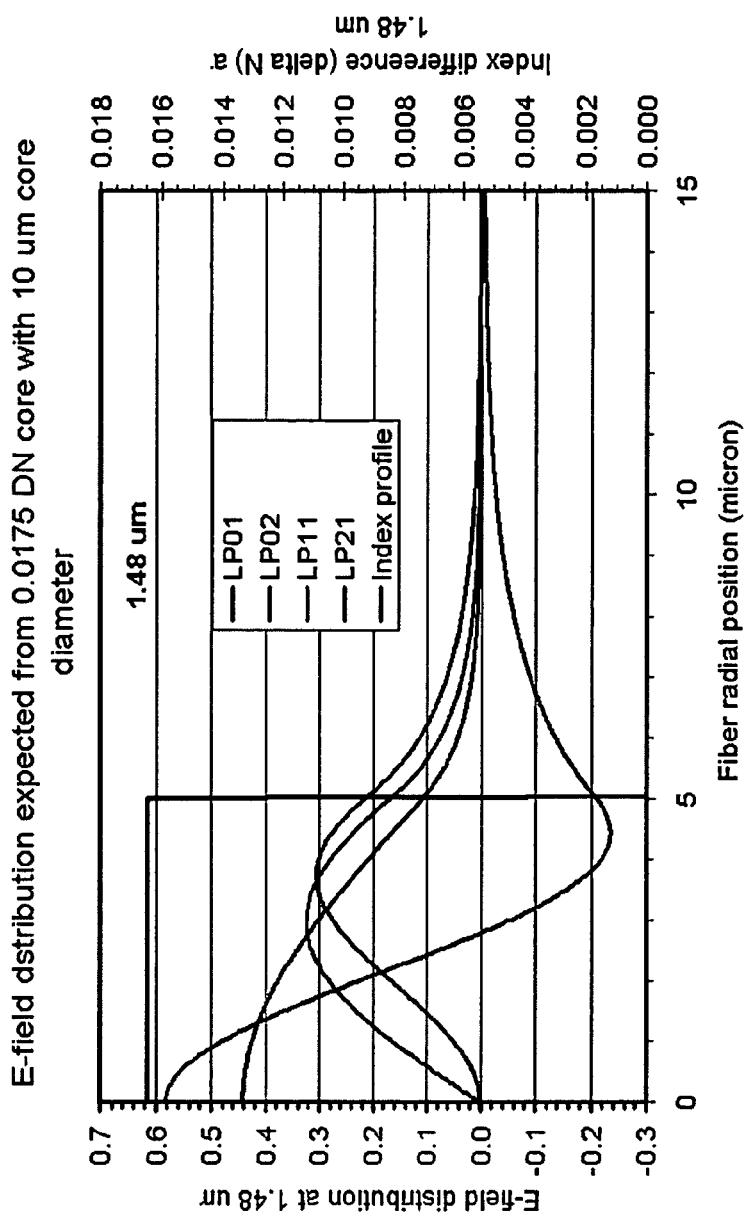
Figure 5:
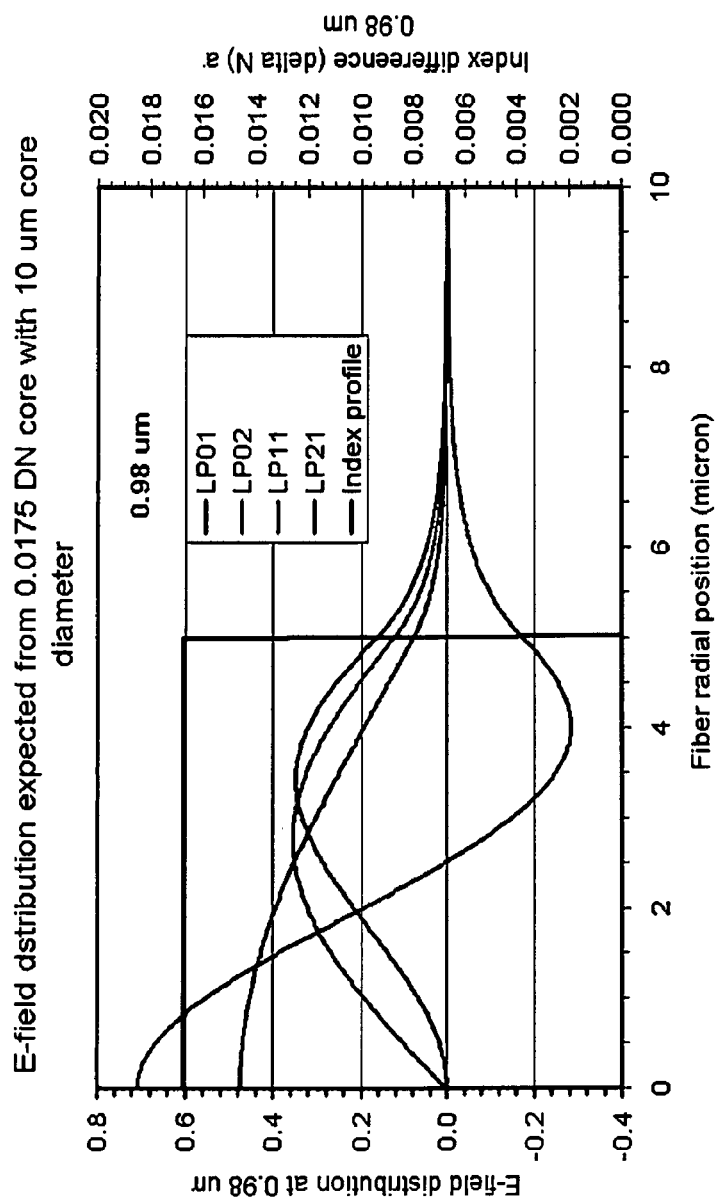

In FIGS. 3, 4, and 5, the e-field distributions for the $LP_{01}$, $LP_{02}$, $LP_{11}$, and $LP_{12}$ modes for a common step index fiber are illustrated at three different wavelengths, i.e., 1550 nm (FIG. 3), 1480 nm (FIG. 4), and 980 nm (FIG. 5). The step index fiber has an index difference of 0.0175 (measured at 632 nm) and core diameter of 10 micron. For the $LP_{11}$ and $LP_{21}$ modes, which have of multiple lobes, the graphs show the field in the radial direction along which the field intensity is the maximum at different wavelengths.

Figure 6:
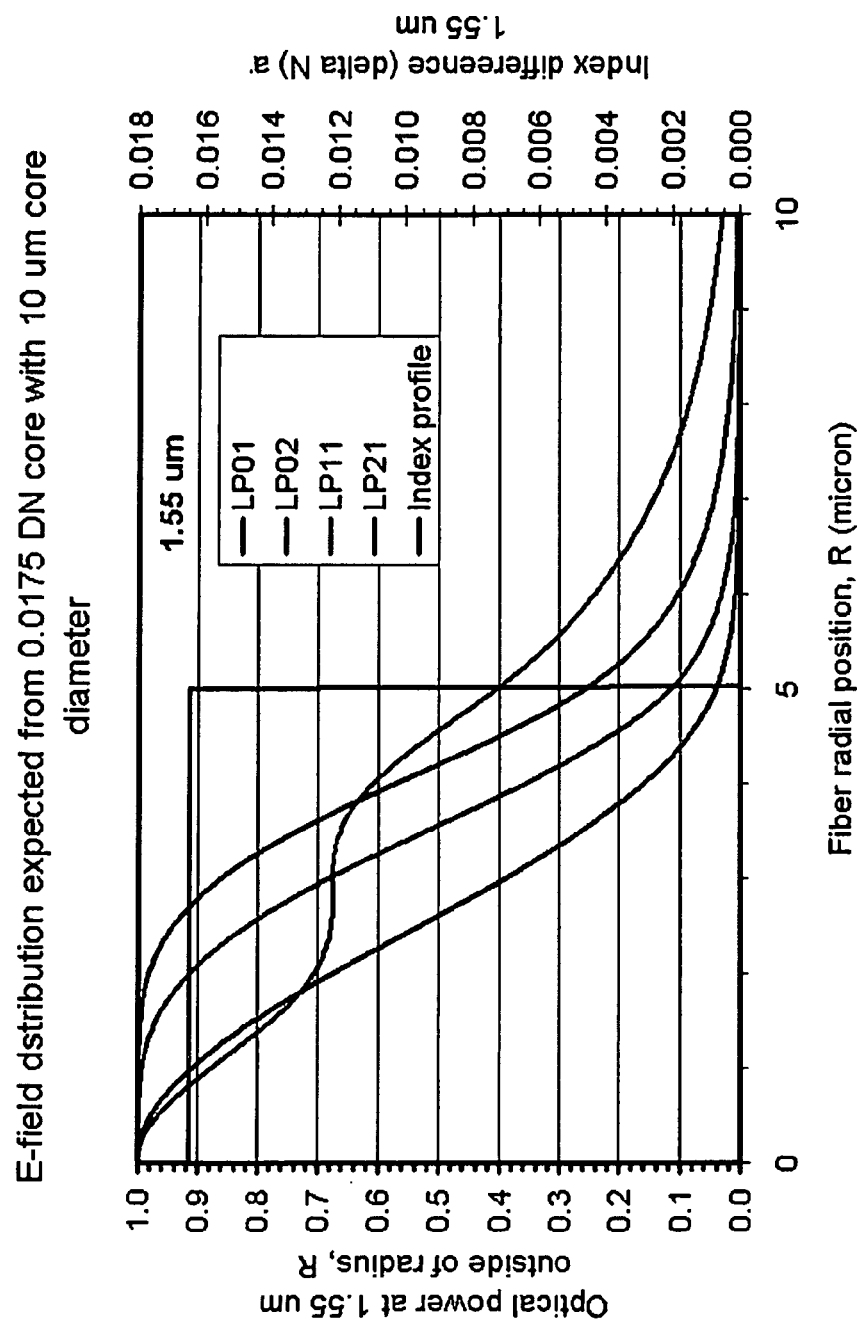
FIGS. 6-8 illustrate a fractional optical power outside of a fiber radial position.
Figure 7:
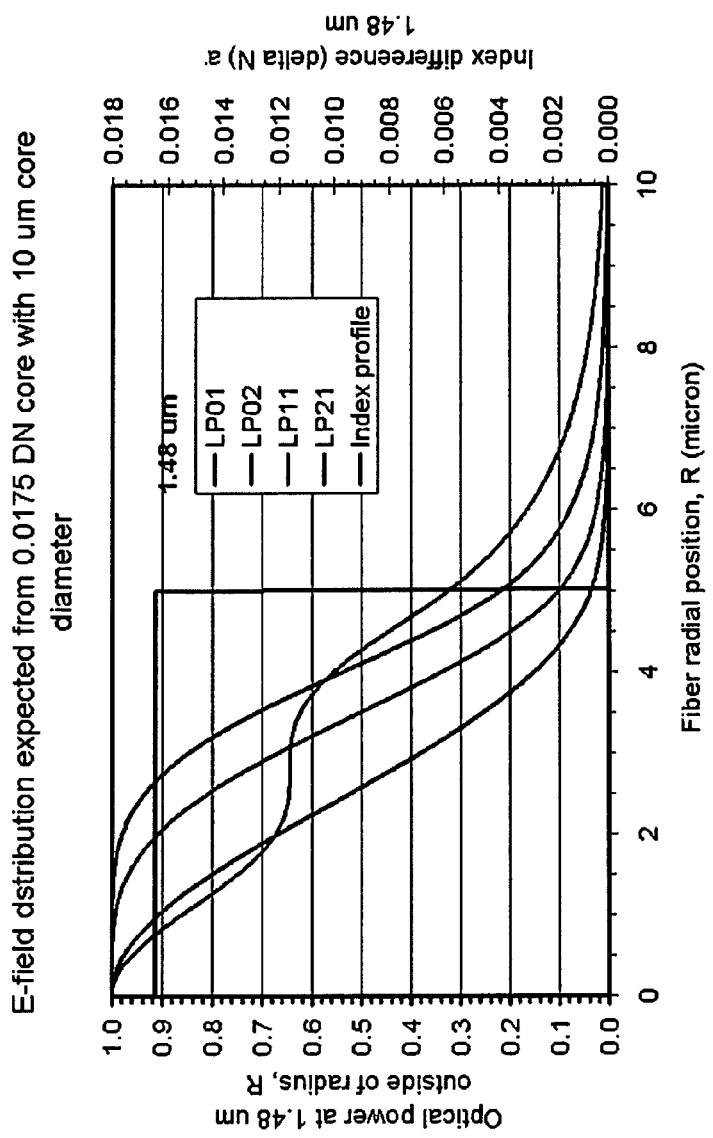
Figure 8:
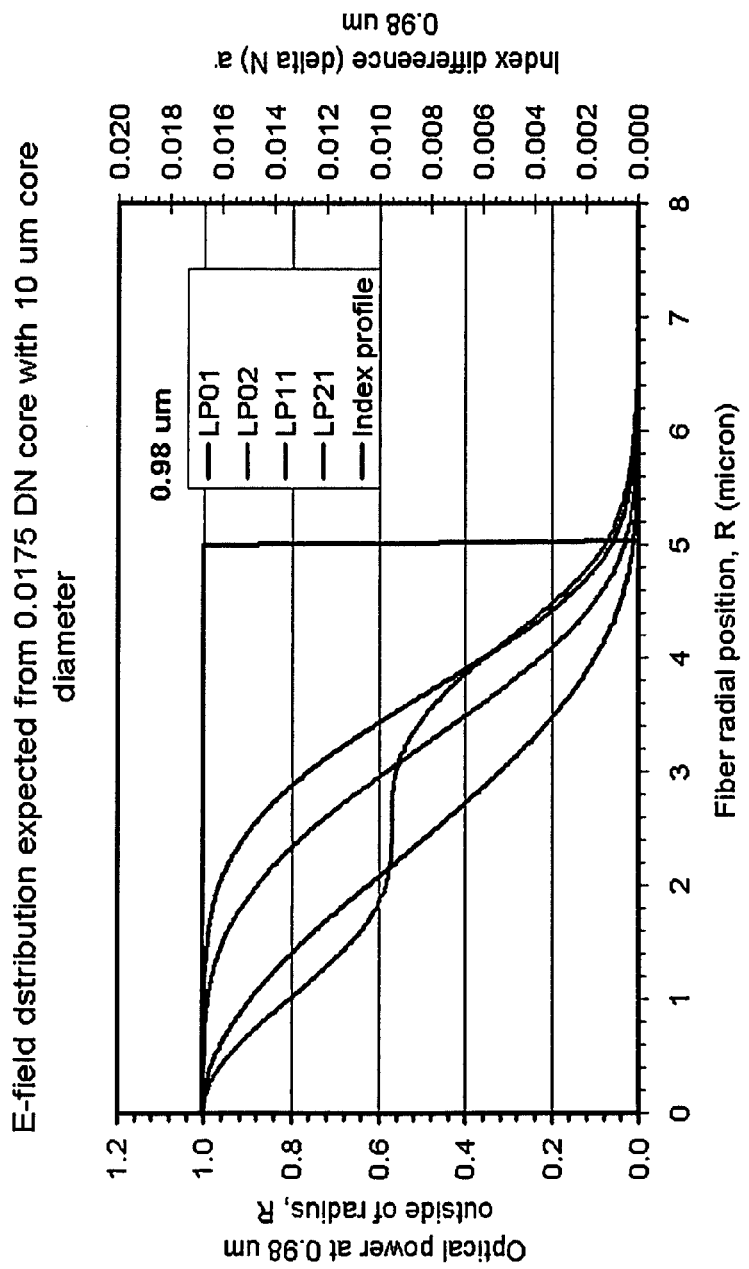

In FIGS. 6, 7, and 8, the fractional optical power lying outside a radius R is plotted for 1550 nm (FIG. 6), 1480 nm (FIG. 7), and 980 nm (FIG. 8), respectively. The refractive index profile is shown by the right ordinate with FIG. 6 for 1550 nm, FIG. 7 for 1480 nm and FIG. 8 for 980 nm.

In an optical amplifying or gain fiber, which typically has dopant within a portion of or the entire core, the overlap factor $\Gamma$, and thus, the gain of various fiber modes with the core region, become different. The gain per unit length of a rare-earth doped optical amplifier is given by, $g=\Gamma(N_2\sigma_e - N_1\sigma_a)$, where $\Gamma$ is the overlap factor, $N_{1,2}$ are the lower and upper state populations, respectively, and $\sigma_{e,a}$ are the emission and absorption cross sections, respectively.

From FIGS. 6, 7 and 8 one can discern the fractional powers $(=1-\Gamma)$ of different modes located outside of a 5-micron-radius core with $\Delta N=0.0175$. Overlap factor, $\Gamma$, which equals the fractional power that remains inside the core are: 95.9% for $LP_{01}$, 59.5% for $LP_{02}$, 88.4% $LP_{11}$ for 74.3% $LP_{21}$ at 1550 nm. The corresponding values for 980 nm and 1480 nm are shown in Table 1.

TABLE 1

| WL(μm) | $LP_{01}$ | $LP_{02}$ | $LP_{11}$ | $LP_{21}$ |
|---|---|---|---|---|
| 0.98 | 98.8% | 92.3% | 96.7% | 93.7% |
| 1.48 | 96.4% | 67.4% | 89.8% | 78.0% |
| 1.55 | 95.9% | 59.5% | 88.4% | 74.3% |

Table 1 shows power content of various modes in a step index core, calculated for different wavelengths.

A fiber amplifier that is based on a nonlinear effect (such as Raman and Brillouin) does not have any rare-earth doping but $GeO_2$ or other elements that enhances the Raman or Brillouin gain coefficient. In a Raman amplifier, the gain can be expressed as, $g_R = G_R P\Gamma/A_{eff}$. Here, $G_R$ is the Raman gain coefficient, P is the pump power, $A_{eff}$ is the effective mode field area of the pump wave, and $\Gamma$ is the normalized overlap integral between the pump and signal field.

Due to the dependency of $\Gamma$ on mode type of the signal wave, the gain experienced by the different modes can be different in a few-mode amplifier (both the rare-earth and Raman/Brillouin amplifiers). Therefore, there is a need for a few-moded fiber amplifier where the modes will be amplified by a substantially equal amount.

This problem has been solved in accordance with at least one aspect of the present invention, by administering mode conversion of each of the launched modes into one of the other modes along the fiber amplifier so that the overall gain experienced by each launched mode becomes substantially the same. This is further explained and illustrated using two examples shown in FIGS. 9 and 10.

Figure 9:
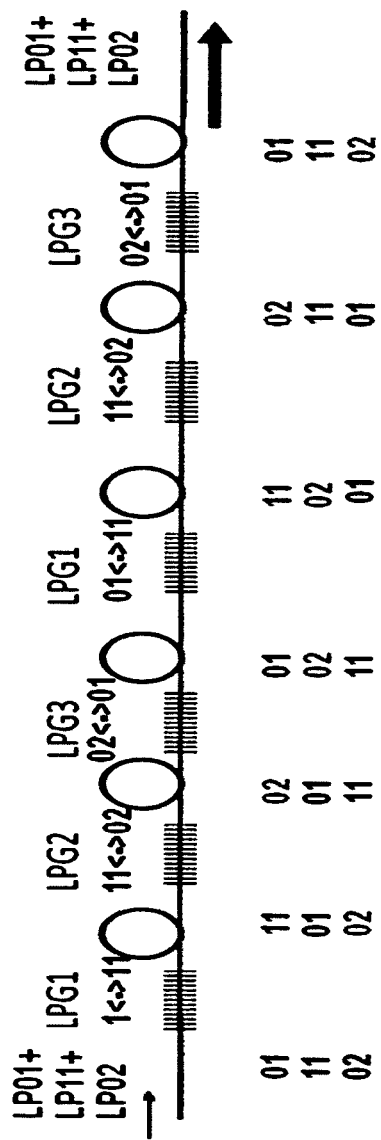
FIGS. 9 and 10 illustrate a gain equalized few-moded fiber device.
Figure 10:
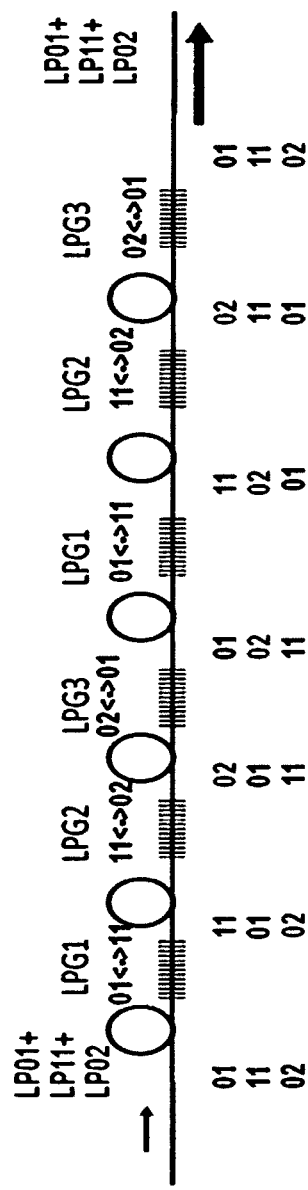

FIGS. 9 and 10 show an amplifier containing six mode converters to convert three input modes ($LP_{01}$, $LP_{11}$, $LP_{02}$) in the sequences as shown in the figures. FIG. 9 shows a length of fiber after the last converter while FIG. 10 shows a length of fiber before the first converter. These mode converters are separated by nominally the same length of gain fiber, l. The mode converters placed within this sequence ensures that each launched mode assumes the other modes during the course of propagation in the amplifier ensuring substantially equal amount of gain. A mode converter $LP_{ab} \leftrightarrow LP_{cd}$ thus has a dual function. It converts mode $LP_{ab}$ to $LP_{cd}$ and also converts mode $LP_{cd}$ to mode $LP_{ab}$ so that no mode is lost. The overall exponential gain for each mode becomes $2l(g_{01}+g_{11}+g_{02})$ where l also represents the nominal spacing between the mode converters and each $g_{x,y}$ represents the gain per meter for the respective mode. Another feature is that when the lengths are substantially equal, the group delay or dispersion associated with each mode becomes substantially the same.

When only two modes are involved (e.g., $LP_{01}$ and $LP_{11}$), at least two converters are needed so that at the exit of the amplifier the modes are restored. The input modes $LP_{01}$ and $LP_{11}$ are transformed into $LP_{11}$ and $LP_{01}$, respectively, by the first converter located somewhat at the middle of the amplifier. The newly-generated $LP_{11}$ and $LP_{01}$ are then converted back to $LP_{01}$ and $LP_{11}$, respectively, by the second converter.

Figure 11:
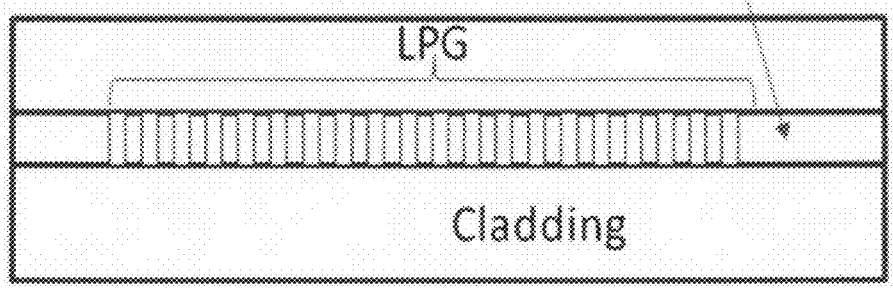
FIG. 11 illustrates periodic index perturbations.

It is possible to convert one mode to the other mode of similar polarization by applying periodic index perturbations (such as that shown in FIG. 11). For example, if a mode $LP_{01}$ and $LP_{02}$ have effective refractive indices of $n_{01}$ and $n_{02}$, respectively, a period of the refractive index perturbation is required given by $\Lambda_{01\Leftrightarrow 02} = \lambda/(n_{01}-n_{02})$. FIG. 11 illustrates that a mode converter can also be made by inscribing long period gratings in the core or in the cladding region in the vicinity of the core.

Figure 12:
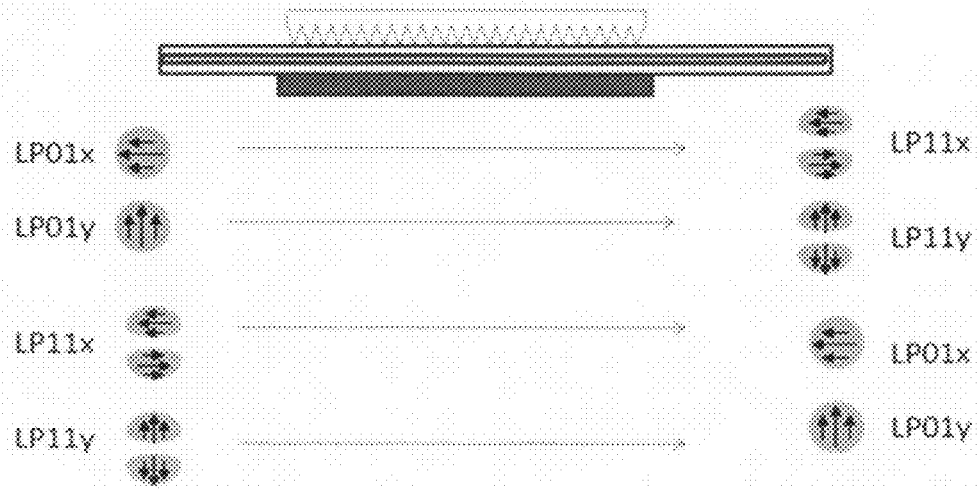
FIG. 12 illustrates conversion between modes using microbending.

FIG. 12 shows a schematic diagram of a mode converter interchanging modes between symmetric $LP_{01}$ and asymmetric $LP_{11}$ modes. Specifically, FIG. 12 is a schematic diagram illustrating conversion between $LP_{01}$ and $LP_{11}$ modes using microbending. Note that the polarization state is preserved.

Figure 13:
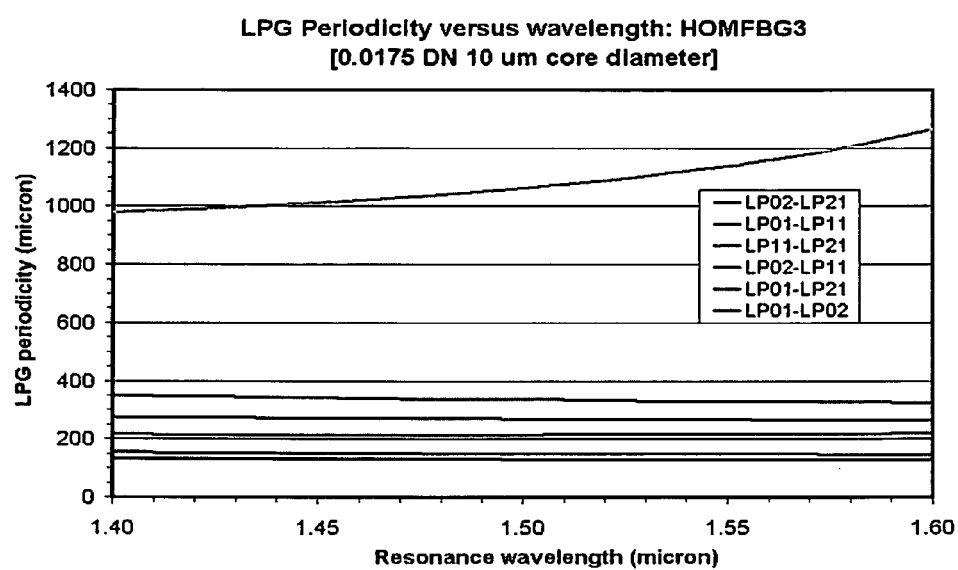
FIG. 13 illustrates periodicity of LPG/microbending related to mode conversion.
Figure 14:
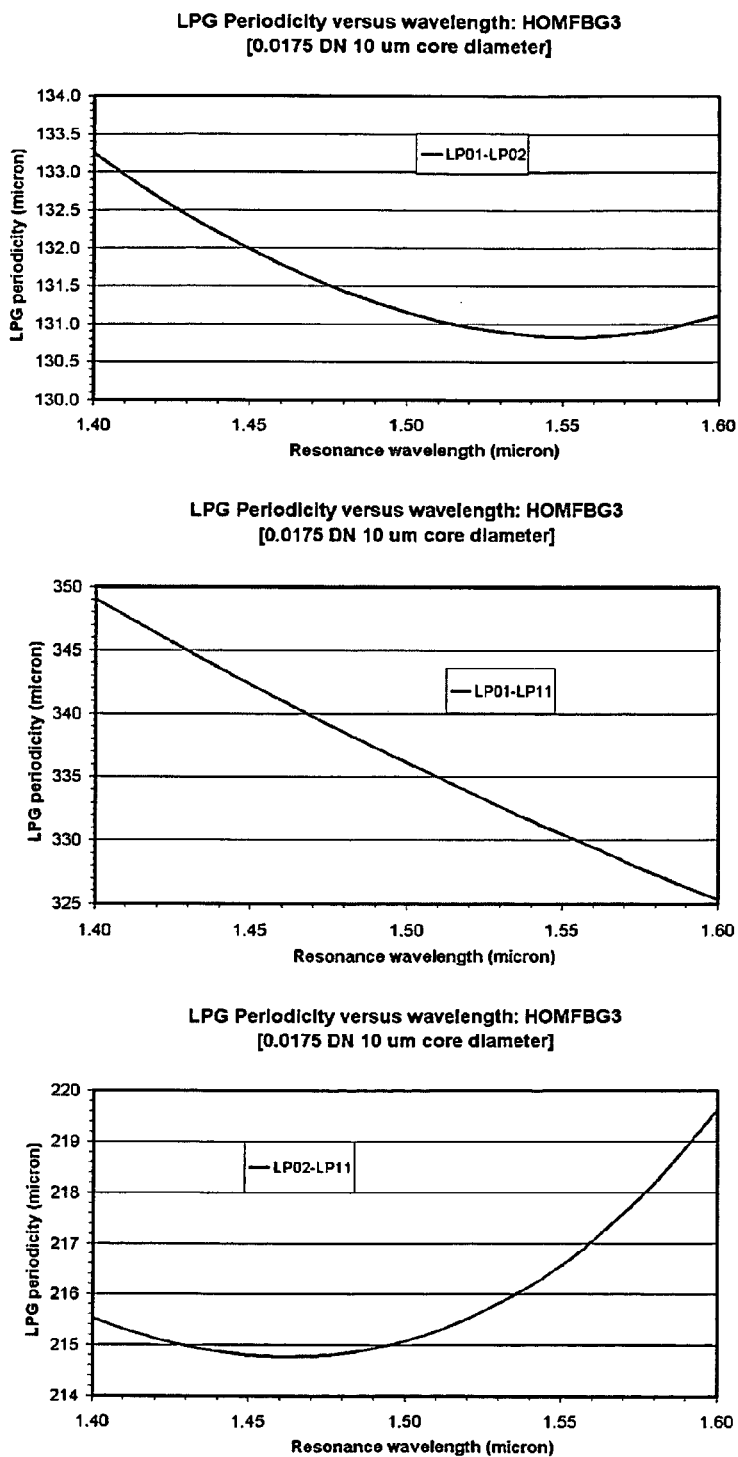
FIGS. 14 and 15 illustrate LPG/microbending as a function of wavelength.
Figure 15:
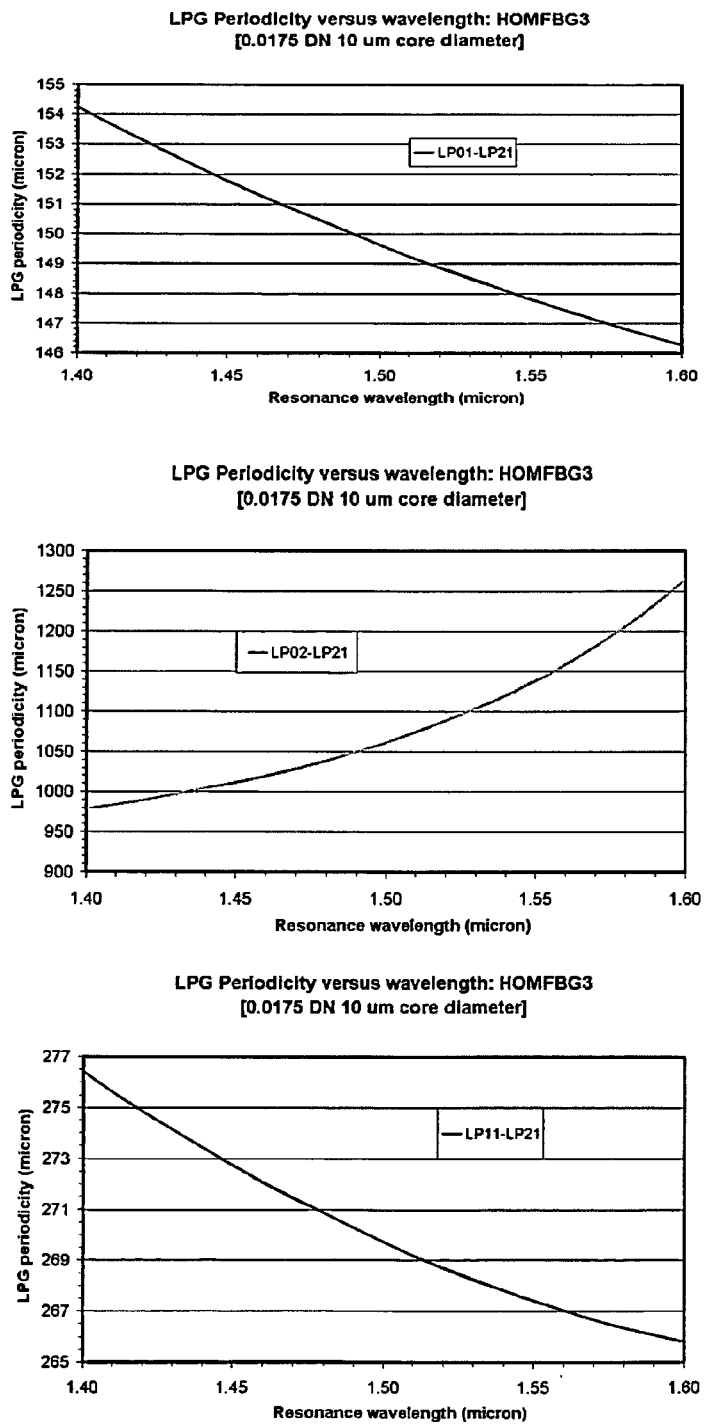

FIG. 13 illustrates the periods of phase perturbations required for mode conversion among four guided modes. Periods are calculated for a fiber with a step index core, a core diameter of 10 microns, and an index difference of 0.0175. One can see that the periodic perturbation that achieves mode conversion among different modes is different over a wide range of wavelengths, which means that mode conversion would take place between only specific pair of modes, thus avoiding cross-talk. FIG. 13 thus illustrates periodicity of LPG/microbending that achieves mode conversion between different pairs of modes. The dependency of periodicity of the LPGs/microbends as a function of wavelength is shown in further details in the graphs of FIGS. 14 and 15, which illustrate LPG/microbending periodicity for different pairs of modes plotted as a function of wavelength.

In this simple step-index profile, the six mode converters among the four guided modes have distinct LPG periods, $\Lambda$. As shown in Table 2, below, most of the required LPG periodicities are between 120-350 microns. It is possible to tailor the periods of required LPGs by adjusting the refractive index profiles of the multimode fiber. For multi-wavelength or broadband operation, it is important that grating periods remain relatively independent of the signal wavelength. This requires that $d\Lambda/d\lambda$ be kept as small a possible, which can be realized by optimization of the index profile.

For conversion between symmetric modes (e.g., $LP_{01}$, $LP_{02}$) and asymmetric modes (e.g., $LP_{11}$), a non-symmetric periodic perturbation (e.g., with lateral stress) can be applied to achieve mode conversion. This can be done efficiently by using periodic microbending with appropriate choices of bend orientation, for example, as shown in FIG. 12.

TABLE 2

| 1.55 μm | $LP_{01}$-$LP_{02}$ | $LP_{01}$-$LP_{11}$ | $LP_{01}$-$LP_{21}$ | $LP_{02}$-$LP_{11}$ | $LP_{02}$-$LP_{21}$ | $LP_{11}$-$LP_{21}$ |
|---|---|---|---|---|---|---|
| Period (μm) | 130.8 | 330.5 | 147.8 | 216.6 | 1139.0 | 267.4 |
| $d\Lambda/d\lambda$ | −0.81 | −107.34 | −33.54 | 43.88 | 1932.45 | −39.50 |
| $d\Lambda/\Lambda d\lambda$ (1/μm) | −0.0062 | −0.3248 | −0.2269 | 0.2026 | 1.6966 | −0.1477 |

Table 2 shows the LPG periodicity and slope of period versus resonance wavelength.

Figures 16, 17:
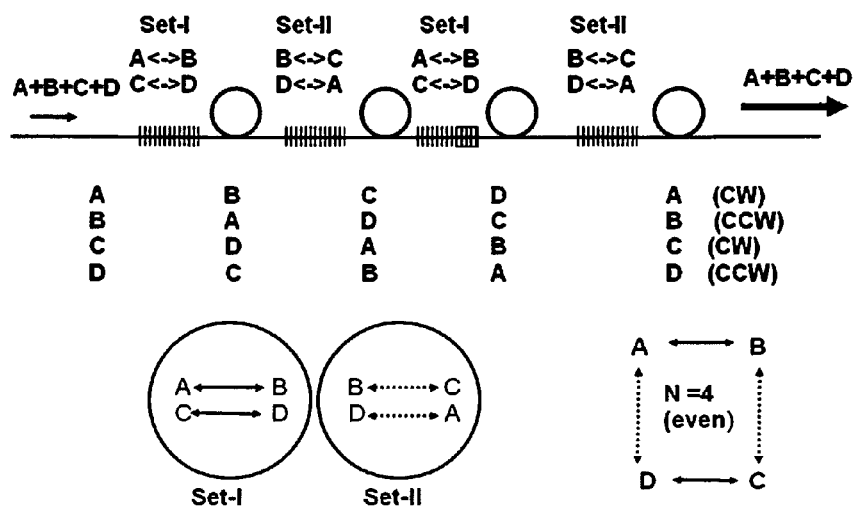
FIG. 16 illustrates a mode conversion sequence.
FIGS. 17 and 18 illustrate cyclic mode conversion.

When four modes (generalized as A, B, C and D) exist, the mode conversion can be initiated in the sequences as illustrated in FIG. 16. One can readily appreciate from FIG. 16 that each mode is restored at the end, and each mode travels one-fourth of the total length. Although mode converters are chosen in periodic sequence of A→B→C→D for launched mode A, other sequences achieved by permutations of the modes (e.g., A→C→D→B, A→D→B→C, etc.) can be used as well.

The number of mode conversions that each mode has to experience can be expressed as N(N−1), which increases sharply as N becomes large. For example, the number of mode conversions will be 2 for N=2, 6 for N=3, and 12 for N=4.

In the following, another embodiment for mode conversion is shown, which significantly reduces the number of mode transformation that each mode undergoes.

A conversion scheme in accordance with one embodiment of the present invention is illustrated in FIG. 17, where each mode converter performs mode conversions between two or more pairs of modes. Consider four modes, A, B, C, and D. FIG. 17 shows a cyclic mode conversion shown for N=4. Each set of mode transformers comprises 2 (=N/2) distinct converters. The total number of conversions that each mode undergoes is 4 (=N). Two sets of composite mode converters are formed, Set-I and Set-II performing mode conversion between (A↔B, C↔D) and (B↔C, D↔A), respectively. When these two sets are placed alternately, a total of N such sets will transform each mode into the other modes and finally restore the signal to its original state. Here, the number of mode transformations that each launched mode would undergo is N making the scaling to larger numbers of modes feasible. Note also that in this scheme one set of modes experiences cyclic mode conversion in one direction (clockwise: A and C), while the other set experiences such conversion in the other direction (counter-clockwise: B and D). The total number of discrete mode converters becomes $N^2/2$. It should be appreciated that this scheme is applicable whenever an even number of modes is present.

Figure 18:
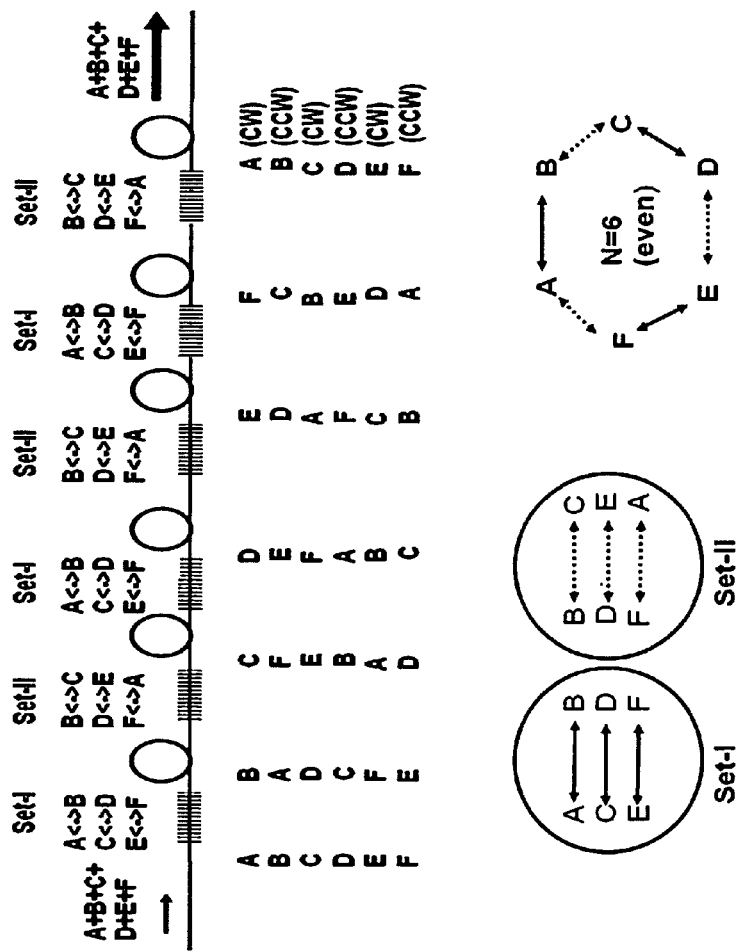

This scheme when applied to six modes is shown in FIG. 18. It is to be understood that each mode is transformed only six times in a cyclic fashion. FIG. 18 shows cyclic mode conversion for N=6. Each set of mode transformers comprises three (=N/2) distinct converters. The total number of conversion each mode undergoes for this configuration is six (=N).

Figure 19:
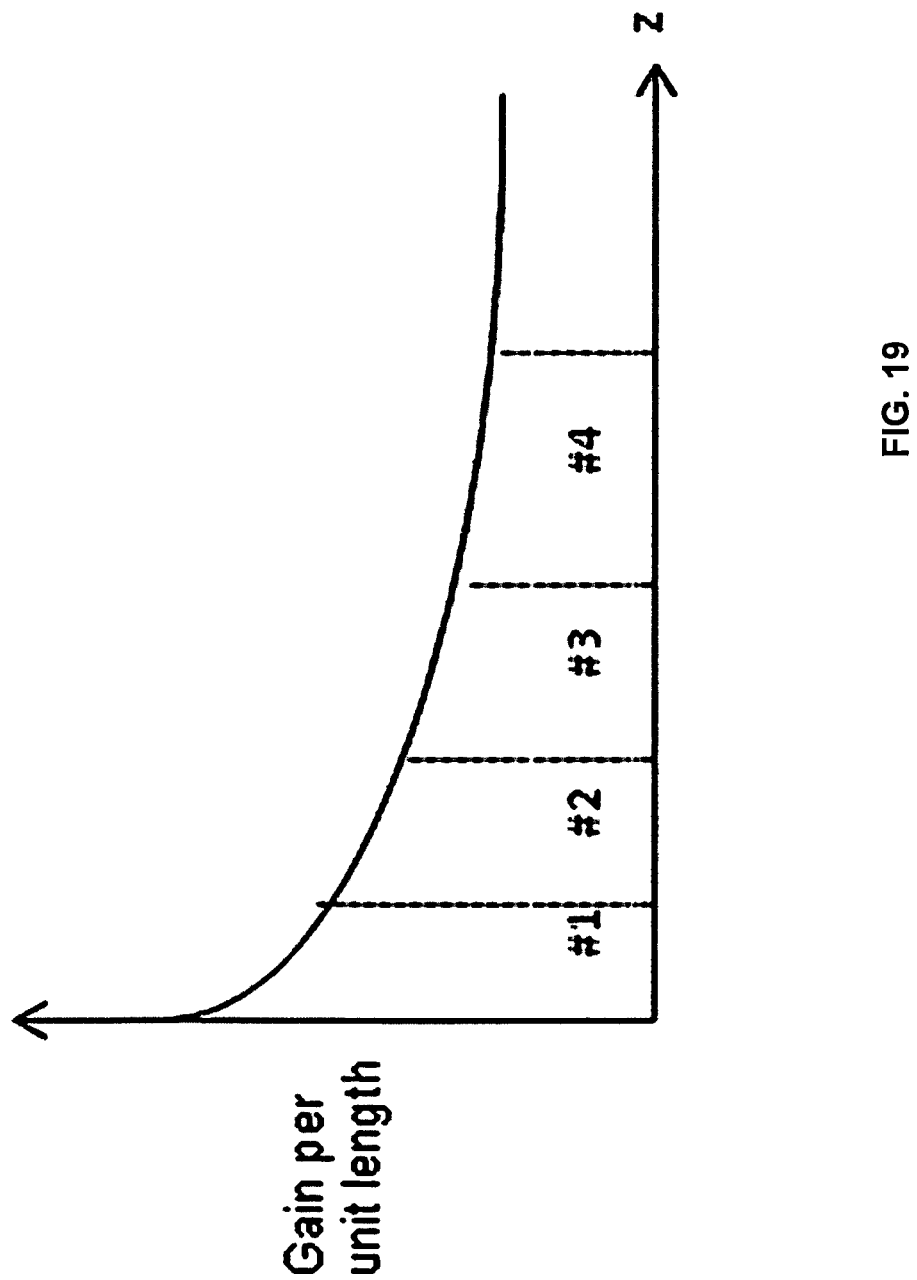
FIG. 19 illustrates the increasing length of section of gain fiber.
Figure 20:
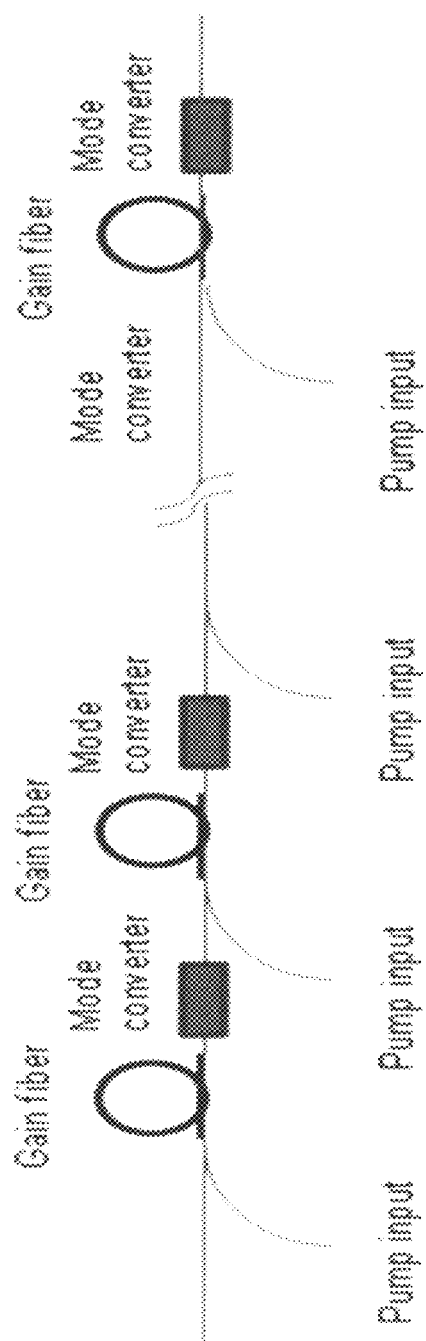
FIG. 20 illustrates an example of employing multiple pump sources.

In the absence of gain saturation the length of the different gain sections may be the same. However, when the gain is depleted due to pump depletion, increasingly longer lengths for successive sections can be selected. As shown in FIG. 19, the length of successive sections of gain fiber is increasingly longer when gain is saturated. It is also possible to pump each gain section individually by separate pump sources. FIG. 20 shows an example of a gain-equalized few-moded fiber amplifier employing multiple pump sources.

Since the core is multimoded for the signal wave, the pump wave may also be split into various modes depending on how it is launched. The relative intensities of the individual modes can be adjusted so that it is absorbed uniformly inside the core. Few-mode fibers suitable for these amplifiers may have one or more cores in a single cladding, where the core is doped or undoped, and if doped, may be doped with a rare-earth dopant, such as Erbium, Ytterbium, and the like, or doped with a non rare-earth element, such as, for example, Germanium. One can also use a rare earth doped fiber with double cladding structures, which are pumped by a multimode fiber into the inner cladding region and the few-moded signal will be carried by the core. A double cladding rare earth doped gain fiber allows uniform absorption of pump in the doped core. The pump intensity inside the core will be equal to:

$$(Local\_Pump\_Power) \times (R_{core}/R_{inner\_cladding})^2$$

Figure 21:
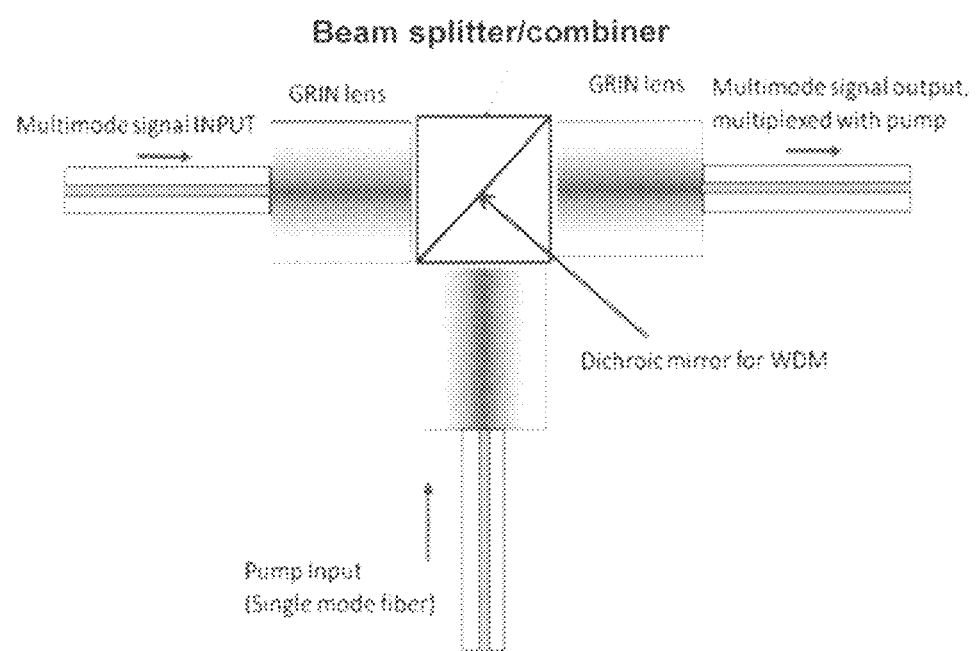
FIG. 21 illustrates a multimode signal and pump combiner.
Figure 22:
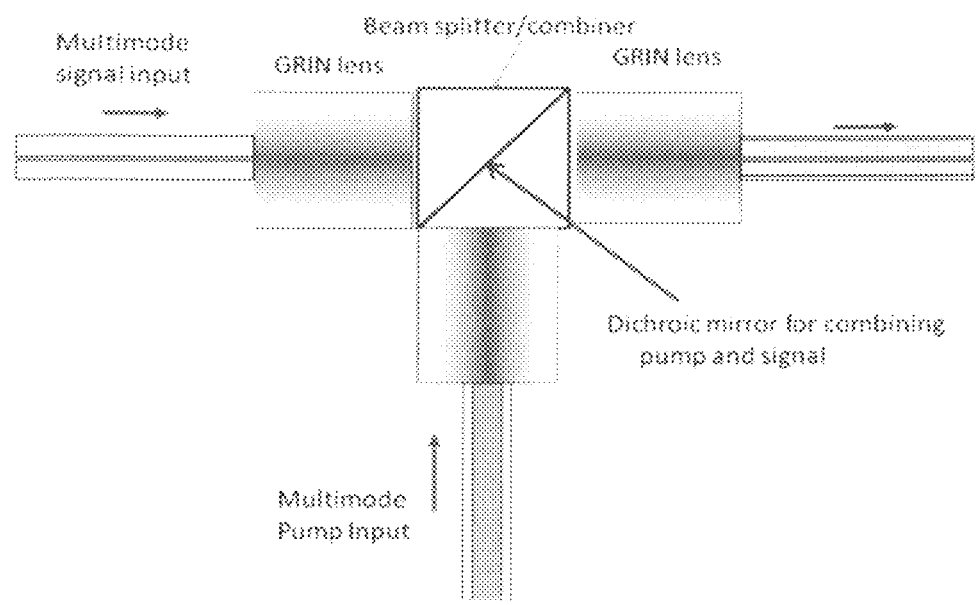
FIG. 22 illustrates multimode pump combiner with cladding pumping.

The pump and the signal can be combined in a tapered fiber coupler using on pedestal fibers or beam collimation using bulk or graded index (GRIN) lenses as shown in FIGS. 21 and 22. FIG. 21 illustrates a multimode signal and pump combiner, while FIG. 22 illustrates a multimode signal and multimode pump combiner for cladding pumping. The few-moded core in the multiplexed port may be doped with rare earth element(s). If undoped, it can be later spliced to a rare earth doped core. The devices of FIGS. 21 and 22 can be used in the opposite direction to split the signal and pump. The GRIN lens has a length nominally equal to quarter of the pitch length. The pump wave is launched through the multimode pump port and coupled into the inner cladding of the double cladding fiber at the combined output port.

Figure 23:
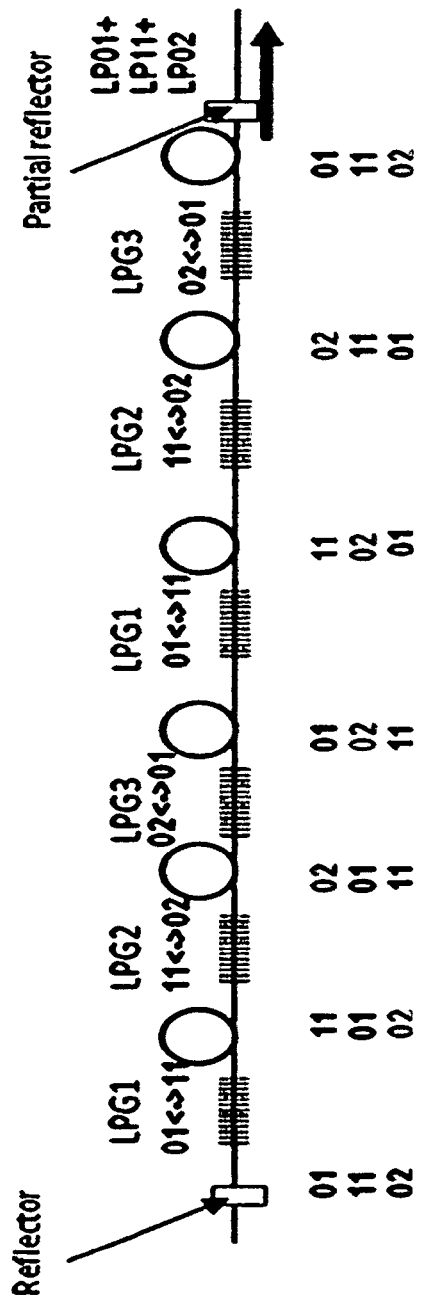
FIGS. 23 and 24 illustrate a multi-moded fiber laser.
Figure 24:
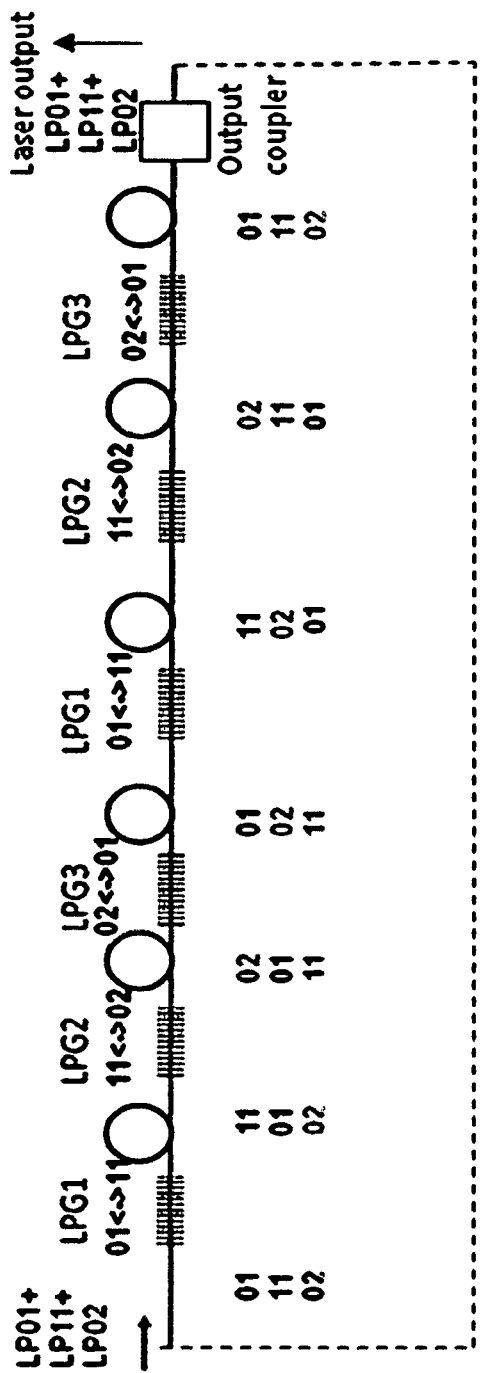

Although examples are shown for multi-moded amplifiers, it should be clear that this can be used to make a multimode laser, by incorporating reflectors to provide feedback or connecting in the form of loop. A schematic diagram of a multi (transverse)-moded fiber laser with a linear cavity is illustrated in FIG. 23, and with a ring cavity in FIG. 24.

Figure 25:
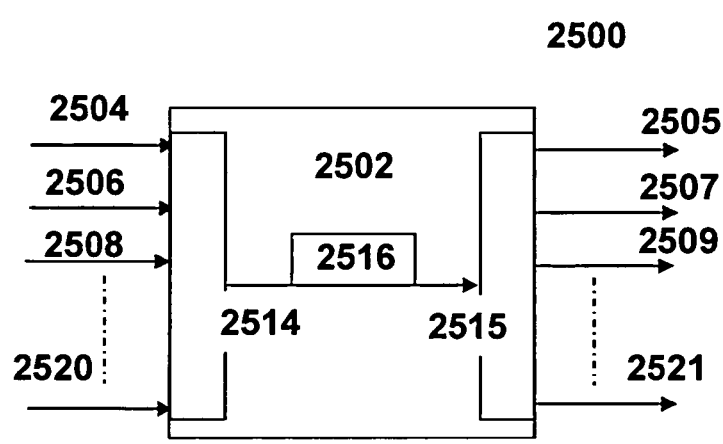
FIG. 25 illustrates a multi-channel mode division multiplexed optical transmission system

The methods, fibers and device as provided herein and in accordance with an aspect of the present invention are applied in a multi-channel mode division multiplexed optical transmission system 2500 as illustrated in FIG. 25. Multiple independent signals, which may be digital optical signals, are provided on inputs 2504, 2506, 2508 and 2520 of the system 2502, which implements the mode converters and few-moded fibers as disclosed herein. While four inputs are shown, there may be fewer or there may be more independent inputs or channels. Each channel is modulated as a modal state of an optical signal which is transmitted to an output wherein all channels are retrieved and separated according to the modal states. Each channel is represented as a modal state of an optical signal that is transmitted to an output. The demodulated signals are provided on outputs 2505, 2507, 2509 and 2521. In accordance with one embodiment, each channel is represented on an optical output of the system 2515 in the same modal state of the optical signal as the modal state it had at its initial optical input 2514.

Box 2516 represents the fibers and converters as disclosed herein. In accordance with one embodiment, all converters and fibers are dimensioned in such a manner that all relevant modal states that were present at the input are also present at the output 2515 and that all modal states have experienced the same or substantially the same transmission characteristics, which includes gain, loss, group delay, dispersion, etc. In one embodiment, the relative difference between modal states at the output as compared to the relative differences at the input is preferably less than 10%, more preferably less than 5%. Accordingly, FIG. 25 illustrates a multi-channel mode division multiplexed optical transmission system.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A few-moded optical fiber device to process an input optical signal containing N modes, where N is an integer greater than or equal to 2, comprising:
   an input few-moded fiber enabled to receive the input signal;
   at least N mode converters arranged in a pre-determined order, wherein a first mode converter of the N mode converters is coupled to the input few-moded fiber, wherein each mode converter transforms one modal state of the N modal states to a different mode;

a few-moded connecting fiber between each of the N mode converters; and an output few-moded fiber coupled to a last mode converter of the N mode converters to provide an output optical signal containing the N modal states, wherein each of the N modes in the optical output signal are characterized by a substantially identical transmission parameter relative to corresponding N modes of the input signal.

2. The device of claim 1, wherein the substantially identical transmission parameter is one or more of gain, loss, group delay, and dispersion.

3. The device of claim 1, wherein the optical signal between the input and the output remains for an equal amount of time in each of the N modes.

4. The device of claim 1, wherein the connecting fiber is a gain fiber.

5. The device of claim 1, wherein the connecting fiber is a passive fiber.

6. The device of claim 1, wherein one or more of the N mode converters is a long period grating.

7. The device of claim 1, wherein one or more of the N mode converters applies periodic micro bends to generate mode conversion.

8. The device of claim 1, wherein one or more of the N mode converters applies a bulk spatial phase modulator.

9. The device of claim 1, wherein one or more of the N mode converters applies a periodic index variation.

10. The device of claim 1, wherein the device is applied in a multi-channel optical transmission system.

11. The device of claim 1, wherein the N mode converters are placed such that at each mode converter, N/2 pairs of modes are interchanged within respective pairs of modes such that all of the N modes remain distinct from one another after each mode conversion.

12. The device of claim 1, wherein the N modes are restored to the input state after propagating through the total of the N mode converters.

13. The device of claim 1, wherein a length of each of the input, output, and connecting few-moded fibers is the same.

14. The device of claim 1, wherein each of the input, output, and connecting few-moded fibers is pumped by a common pump.

15. The device of claim 1, wherein each of the input, output, and connecting few-moded fibers is pumped by individual pump waves.

16. The device of claim 1, wherein each of the N modes is a higher order mode.

17. The device of claim 1, wherein the N modes comprise a fundamental mode and one or more higher order modes.

18. The device of claim 1, wherein one or more of the N mode converters applies a volume phase grating.

19. The device of claim 1, wherein one or more of the N mode converters applies a photonic lattice.

* * * * *